(12) United States Patent
Park et al.

(10) Patent No.: US 10,903,489 B2
(45) Date of Patent: Jan. 26, 2021

(54) PRECURSOR FOR PREPARATION OF LITHIUM COMPOSITE TRANSITION METAL OXIDE, METHOD FOR PREPARING THE SAME AND LITHIUM COMPOSITE TRANSITION METAL OXIDE OBTAINED FROM THE SAME

(71) Applicant: LG Chem, Ltd., Seoul (KR)

(72) Inventors: Sang Min Park, Daejeon (KR); Sun Sik Shin, Daejeon (KR); Byung Chun Park, Daejeon (KR); Hye Lim Jeon, Daejeon (KR); Bo Ram Lee, Daejeon (KR)

(73) Assignee: LG Chem, Ltd.

( * ) Notice: Subject to any disclaimer, the term of this patent is extended or adjusted under 35 U.S.C. 154(b) by 0 days.

(21) Appl. No.: 16/394,624

(22) Filed: Apr. 25, 2019

(65) Prior Publication Data

US 2019/0252679 A1     Aug. 15, 2019

Related U.S. Application Data

(62) Division of application No. 14/906,488, filed as application No. PCT/KR2014/007613 on Aug. 18, 2014, now Pat. No. 10,355,275.

(30) Foreign Application Priority Data

Aug. 20, 2013    (KR) ........................ 10-2013-0098746

(51) Int. Cl.
*H01M 4/505*     (2010.01)
*C01G 45/12*     (2006.01)
(Continued)

(52) U.S. Cl.
CPC .......... *H01M 4/505* (2013.01); *C01G 45/006* (2013.01); *C01G 45/1228* (2013.01);
(Continued)

(58) Field of Classification Search
CPC ............... H01M 4/505; H01M 10/052; H01M 2004/028; C01G 45/1228; C01G 45/1257;
(Continued)

(56) References Cited

U.S. PATENT DOCUMENTS

| 7,579,114 B2 | 8/2009 | Ohzuku et al. |
| 2004/0126660 A1 | 7/2004 | Ohzuku et al. |

(Continued)

FOREIGN PATENT DOCUMENTS

| CN | 101041472 A | 9/2007 |
| CN | 101483265 A | 7/2009 |

(Continued)

OTHER PUBLICATIONS

Extended European Search Report for Application No. EP14837239 dated Jan. 25, 2017.

(Continued)

*Primary Examiner* — Andrew J. Oyer
(74) *Attorney, Agent, or Firm* — Lerner, David, Littenberg, Krumholz & Mentlik, LLP

(57) ABSTRACT

Disclosed are a precursor for preparation of a lithium composite transition metal oxide, a method for preparing the same and a lithium composite transition metal oxide obtained from the same. More particularly, the transition metal precursor which has a composition represented by Formula 1 below and is prepared in an aqueous transition metal solution, mixed with a transition metal-containing salt, including an alkaline material, the method for preparing the same and the lithium composite transition metal oxide obtained from the same are disclosed.

$$Mn_aM_b(OH_{1-x})_{2-y}A_y \qquad (1)$$

wherein M is at least one selected form the group consisting of Ni, Ti, Co, Al, Cu, Fe, Mg, B, Cr, Zr, Zn and Period II transition metals; A is at least one selected (Continued)

form the group consisting of anions of $PO_4$, $BO_3$, $CO_3$, F and $NO_3$, and $0.5 \leq a \leq 1.0$; $0 \leq b \leq 0.5$; $a+b=1$; $0<x<1.0$; and $0 \leq y \leq 0.02$.

19 Claims, 3 Drawing Sheets

(51) Int. Cl.
    *C01G 51/00*     (2006.01)
    *C01G 53/00*     (2006.01)
    *C01G 45/00*     (2006.01)
    *H01M 10/052*     (2010.01)
    *H01M 4/02*     (2006.01)

(52) U.S. Cl.
CPC ....... *C01G 45/1257* (2013.01); *C01G 51/006* (2013.01); *C01G 51/50* (2013.01); *C01G 51/56* (2013.01); *C01G 53/006* (2013.01); *C01G 53/50* (2013.01); *C01G 53/56* (2013.01); *H01M 10/052* (2013.01); *C01P 2004/03* (2013.01); *C01P 2006/40* (2013.01); *H01M 2004/028* (2013.01); *Y02T 10/70* (2013.01)

(58) Field of Classification Search
CPC ........ C01G 51/50; C01G 51/56; C01G 53/50; C01G 53/56; C01G 45/006; C01G 51/006; C01G 53/006; Y02T 10/7011; C01P 2004/03; C01P 2006/40
See application file for complete search history.

(56) References Cited

U.S. PATENT DOCUMENTS

| | | | |
|---|---|---|---|
| 2010/0102282 A1 | 4/2010 | Malcus et al. | |
| 2011/0027651 A1 | 2/2011 | Sun et al. | |
| 2011/0305947 A1 | 12/2011 | Song et al. | |
| 2012/0043499 A1 | 2/2012 | Shin et al. | |
| 2012/0097901 A1* | 4/2012 | Schroedle | H01M 4/5825 252/506 |
| 2012/0175568 A1* | 7/2012 | Krippels | B82Y 30/00 252/519.14 |
| 2014/0272587 A1 | 9/2014 | Kang et al. | |
| 2014/0346393 A1 | 11/2014 | Park et al. | |

FOREIGN PATENT DOCUMENTS

| | | |
|---|---|---|
| EP | 0390677 A1 | 10/1990 |
| EP | 0646546 A1 | 4/1995 |
| EP | 2518019 A1 | 10/2012 |
| JP | S63-187571 A | 8/1988 |
| JP | H11-345613 A | 12/1999 |
| JP | 2011057518 A | 3/2011 |
| JP | 2015513513 A | 5/2015 |
| KR | 20090102138 A | 9/2009 |
| KR | 20090105868 A | 10/2009 |
| KR | 20110073630 A | 6/2011 |
| KR | 20110136687 A | 12/2011 |
| KR | 20130090341 A | 8/2013 |

OTHER PUBLICATIONS

International Search Report for Application No. PCT/KR2014/007613 dated Nov. 24, 2014.

* cited by examiner

[FIG. 1]
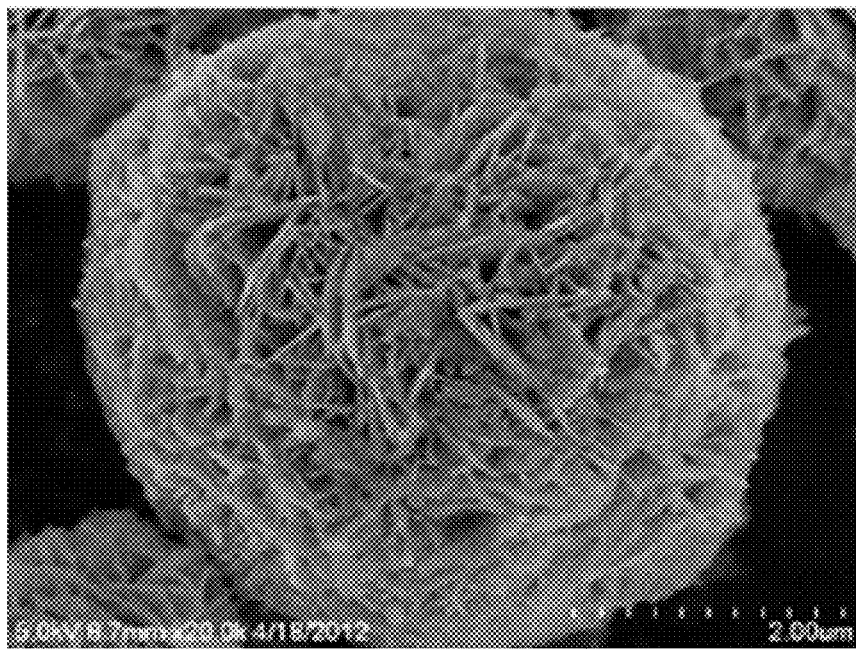

[FIG. 2]
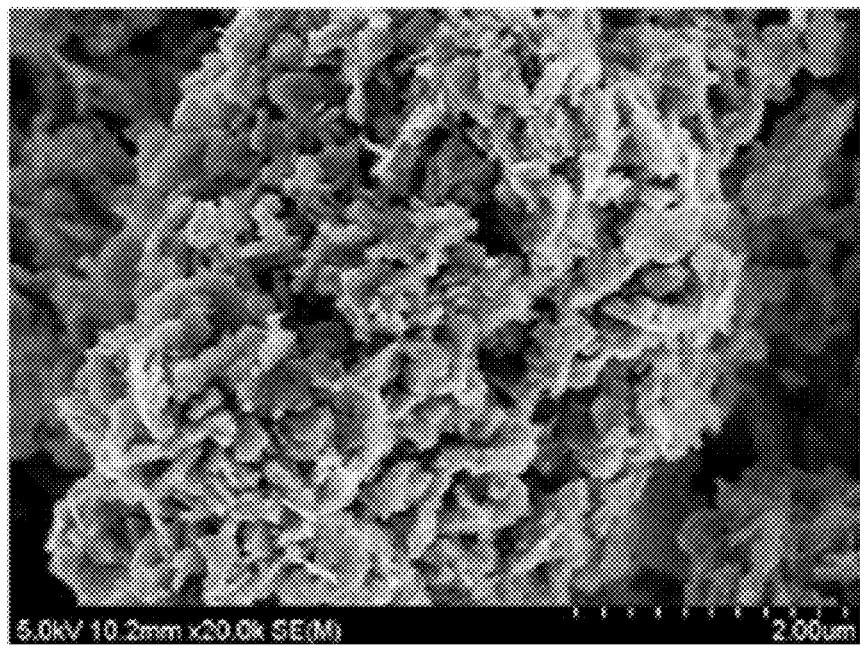

[FIG. 3]
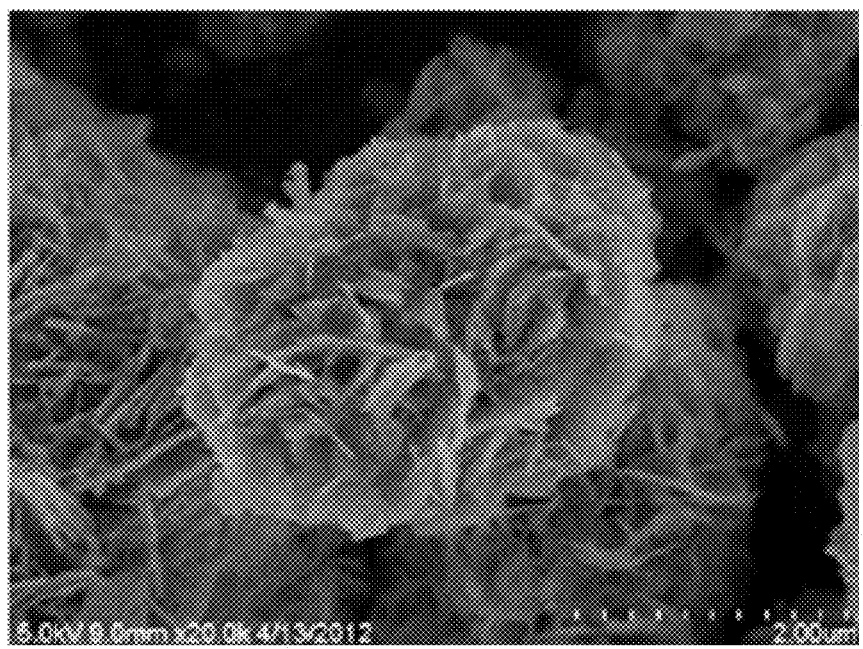
[FIG. 4]
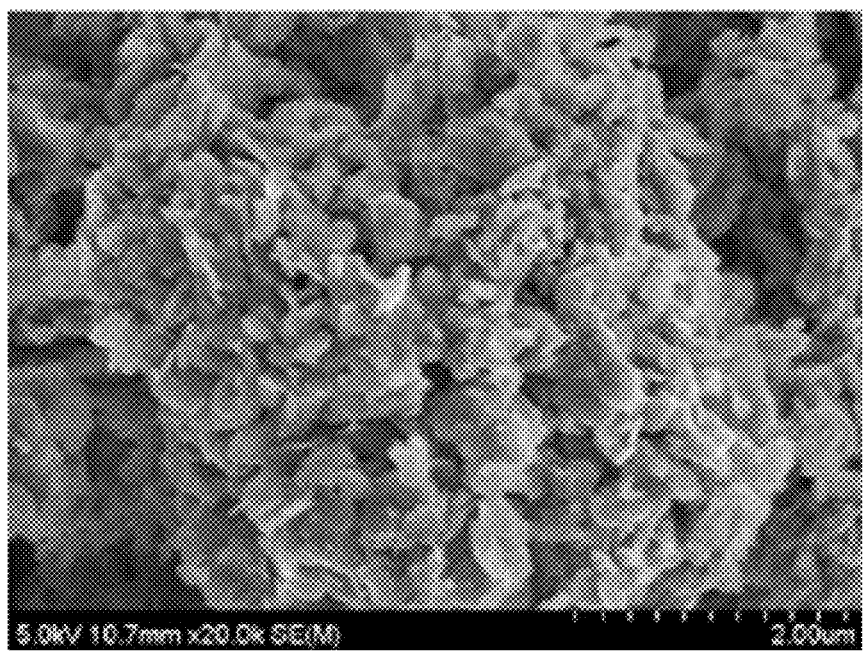

PRECURSOR FOR PREPARATION OF LITHIUM COMPOSITE TRANSITION METAL OXIDE, METHOD FOR PREPARING THE SAME AND LITHIUM COMPOSITE TRANSITION METAL OXIDE OBTAINED FROM THE SAME

CROSS-REFERENCE TO RELATED APPLICATIONS

This application is a divisional of U.S. application Ser. No. 14/906,488, filed Jan. 20, 2016, which is a national phase entry under 35 U.S.C. § 371 of International Application No. PCT/KR2014/007613, filed Aug. 18, 2014, which claims priority to Korean Patent Application No. 10-2013-0098746, filed Aug. 20, 2013, the disclosures of which are incorporated herein by reference.

TECHNICAL FIELD

The present invention relates to a precursor for preparation of a lithium composite transition metal oxide, a method for preparing the same and a lithium composite transition metal oxide obtained from the same. More particularly, the present invention relates to a transition metal precursor which has a specific composition and is prepared in an aqueous transition metal solution, mixed with a transition metal-containing salt, including an alkaline material, a method for preparing the same and a lithium composite transition metal oxide obtained from the same.

BACKGROUND ART

As mobile device technology continues to develop and demand therefor continues to increase, demand for secondary batteries as energy sources is rapidly increasing. Among these secondary batteries, much research has focused on lithium secondary batteries having high energy density and discharge voltage. Such batteries are commercially available and widely used.

Generally, as cathode active materials for lithium secondary batteries, lithium-containing cobalt oxides such as $LiCoO_2$ are mainly used. In addition thereto, use of lithium-containing manganese oxides such as $LiMnO_2$ having a layered crystal structure, $LiMn_2O_4$ having a spinel crystal structure, and the like and lithium-containing nickel oxides such as $LiNiO_2$ is also under consideration.

Among cathode active materials, $LiCoO_2$ is widely used due to excellent overall physical properties such as excellent cycle properties, and the like. However, $LiCoO_2$ is low in safety and expensive due to resource limitations of cobalt as a raw material. Lithium nickel based oxides such as $LiNiO_2$ are cheaper than $LiCoO_2$ and exhibit high discharge capacity when charged to a voltage of 4.25 V. However, the lithium nickel based oxides have problems such as high production costs, swelling due to gas generation in batteries, low chemical stability, high pH and the like.

In addition, lithium manganese oxides, such as $LiMnO_2$, $LiMn_2O_4$, and the like, are advantageous in that they contain Mn, which is an abundant and environmentally friendly raw material, and thus are drawing much attention as a cathode active material that can replace $LiCoO_2$. In particular, among the lithium manganese oxides, $LiMn_2O_4$ has advantages such as a relatively cheap price, high output and the like. On the other hand, $LiMn_2O_4$ has lower energy density, when compared with $LiCoO_2$ and three component-based active materials.

To overcome these drawbacks, a variety of materials have been developed. Especially, layered structure transition metal oxides such as $LiNi_{1/3}Mn_{1/3}Co_{1/3}O_2$, $LiNi_{0.5}Mn_{0.3}Co_{0.2}O_2$ and the like including two or more materials of Ni, Mn and Co have been highlighted.

However, these materials do not satisfy requirements of medium and large batteries such as those used in electric vehicles, systems for storing power and the like.

Accordingly, study into Mn-enriched $(1-x)LiMO_{2-x}Li_2MO_3$ based materials stable under high voltage is being conducted. However, the Mn-enriched $(1-x)LiMO_{2-x}Li_2MO_3$ based materials include a large amount of Mn and thereby are easily oxidized by dissolved oxygen inside an aqueous transition metal solution during synthesis of a transition metal precursor through a co-precipitation method, and, accordingly, synthesis is not easy.

To compensate for this problem, methods such as surface treatment, formation of a core-shell structure and substitution with hetero elements and the like have been tried. However, the methods also are not suitable for easy synthesis. In addition, there are still problems such as additional costs during processes, deterioration of precursor tap density and the like.

As described above, a precursor for preparation of a lithium composite transition metal oxide having satisfactory performance and a lithium composite transition metal oxide obtained from the same has yet to be developed.

DISCLOSURE

Technical Problem

The present invention aims to address the aforementioned problems of the related art and to achieve technical goals that have long been sought.

As a result of a variety of extensive and intensive studies and experiments, the inventors of the present invention developed a transition metal precursor having a specific composition resulting in improvements in crystallizability, spheroidization degree of a pulverulent body and tap density, and confirmed that, when a lithium composite transition metal oxide prepared using the transition metal precursor was used as a cathode active material, an electrode preparation process is easy and electrochemical characteristics of a secondary battery based on the lithium composite transition metal oxide are improved, thus completing the present invention.

Technical Solution

In accordance with one aspect of the present invention, provided is a transition metal precursor, having a composition represented by Formula 1 below:

$$Mn_aM_b(OH_{1-x})_{2-y}A_y \tag{1}$$

wherein M is at least one selected form the group consisting of Ni, Ti, Co, Al, Cu, Fe, Mg, B, Cr, Zr, Zn and Period II transition metals; A is at least one selected form the group consisting of anions of $PO_4$, $BO_3$, $CO_3$, F and $NO_3$; and $0.5 \leq a \leq 1.0$; $0 \leq b \leq 0.5$; $a+b=1$; $0<x<1.0$; and $0<y \leq 0.02$.

More specifically, in one specific embodiment, when M is Ni and Co, the transition metal is prepared in an aqueous transition metal solution, mixed with an alkaline material, a transition metal-containing salt having a first anion, a second anion selected from the group consisting of $PO_4$, $BO_3$, $CO_3$, F and $NO_3$ and a reducing agent, wherein the reducing agent is a sugar-based material; and wherein the transition metal-containing salt consists of a transition metal cation and the first anion:

In Formula 1, x may be particularly 0.2 or more and less than 0.5, more particularly, 0.3 or more and less than 0.5.

In one specific embodiment, oxidation number of Mn may be +2 to +3.5.

In one specific embodiment, the transition metal precursor according the present invention may be prepared using a co-precipitation method. Through the co-precipitation method, at least two transition metal elements are co-precipitated by precipitation reaction in an aqueous solution. In a specific embodiment, a transition metal precursor including at least two transition metals may be prepared by mixing transition metal-containing salts in a desired molar ratio in consideration of the amounts of the transition metals to prepare an aqueous solution and then by performing co-precipitation while maintaining the resulting solution at alkaline PH by adding a strong base such as sodium hydroxide or the like and, if necessary, an additive such as ammonia or the like.

Here, desired average particle diameter, particle diameter distribution and particle density may be adjusted by appropriately adjusting temperature, pH, reaction time, slurry concentration, ion concentration, and the like. In this regard, pH may be in the range of 9 to 13, for example, in the range of 9 to 12, and, in some cases, reaction may be performed in multiple steps.

However, when the fraction of Mn in the composition is 0.4 or more, Mn is readily oxidized by dissolved oxygen inside an aqueous transition metal solution during a preparation process of the precursor and, as such, uniform precipitation of transition metal elements is difficult.

Accordingly, in one specific embodiment, the transition metal precursor may further include a reducing agent to prevent oxidation of Mn and thereby the transition metal precursor has a uniform diameter.

The reducing agent may be included in 0.1 to 30 mol %, particularly, 1.0 to 10 mol %, based on the molar amount of the aqueous transition metal solution. When the amount of the reducing agent is less than 0.1 mol %, it is not easy to prevent oxidation of Mn due to too small amount of the reducing agent. On the other hand, when the amount of the reducing agent exceeds 30 mol %, the transition metal hydroxide has strong anti-precipitation tendency and, as such, characteristics of a pulverulent body may be deteriorated.

In one specific embodiment, the reducing agent may be at least one selected form the group consisting of hydrazine, oxalic acid, ascorbic acid, and particularly a sugar-based material.

The sugar-based material may be at least one selected form the group consisting of, for example, fructose, sucrose, glucose, galactose, lactose, maltose, starch, and dextrin.

When the sugar-based material is used as a reducing agent, the sugar-based material exists on a surface of the transition metal-containing salt and thus prevents cohesion of particles. Accordingly, a transition metal precursor having high porosity and a large specific surface area may be prepared. In addition, the sugar-based material may exist in inner pores or on a particle surface of the transition metal precursor. Furthermore, the reducing agent existing inside the transition metal precursor is carbonized and some reducing agent exists, and, as such, the transition metal precursor has carbon treatment effects. Accordingly, after sintering, electrochemical characteristics may be improved.

Although the transition metal precursor has the advantages described above by adding the reducing agent, the tap density of the pulverulent body may be reduced and thereby an electrode process may become difficult, due to relatively high porosity.

The inventors of the present invention realized the above problem and, as a result of intensive and extensive studies, discovered that the transition metal hydroxide may be more easily precipitated and cohesive force of particles may be improved, and, as such, the crystallizability, spheroidization degree and tap density of the transition metal precursor may be improved, in spite of addition of the reducing agent, by substituting anion sites with anions of $PO_4$, $BO_3$, $CO_3$, F, $NO_3$ and the like during a preparation process of a transition metal precursor containing a high manganese content. The inventors of the present invention also discovered that, when a lithium composite transition metal oxide is prepared using the transition metal precursor, an electrode process is easy and a secondary battery including the transition metal precursor as a cathode active material has superior initial discharge capacity and efficiency, and improved output characteristics.

However, when the amount of substituted anions exceeds 0.02, charge and discharge capacity, and efficiency are greatly reduced. Therefore, the amount of substituted anions exceeding 0.02 is not preferable.

In one specific embodiment, as the transition metal-containing salt, a transition metal-containing salt having anions easily decomposed and volatilized during sintering is preferable. The transition metal-containing salt may be sulfates, nitrates or carbonates. As specific examples, the transition metal-containing salt may be nickel sulfate, manganese sulfate, nickel nitrate, manganese nitrate, nickel carbonate, manganese carbonate or the like, but the present disclosure is not limited thereto.

In addition, the alkaline material may be sodium hydroxide, potassium hydroxide, lithium hydroxide or the like, preferably sodium hydroxide. However, the present disclosure is not limited thereto.

The present invention also provides a method of preparing the transition metal precursor.

In particular, the transition metal precursor according to the present invention may be prepared according to a method including:

(i) preparing an aqueous transition metal solution including a transition metal-containing salt for preparing a precursor;

(ii) mixing anions with the aqueous transition metal solution to substitute anion sites of the precursor; and (iii) co-precipitating by adding a strong base after the mixing.

The anions may be added by mixing with other materials such as a transition metal-containing salt or the like during the precursor synthesis process so long as other side reaction does not occur, or may be separately added. However, in consideration of process cost reduction, the anions are preferably added by mixing with other materials.

In one specific embodiment, in step (ii), a reducing agent, besides anions, may be further added and mixed.

Here, the reducing agent may be added at the same time with a material such as the transition metal-containing salt or the like or may be separately added. When the reducing agent is separately added, addition amount per hour, the concentration of the reducing agent or the like may be an important variable in precursor formation.

In one specific embodiment, the concentration of the reducing agent may be 2.0 mol % to 7.0 mol %. When the concentration of the reducing agent is less than 2.0 mol %, desired effects are insignificant. On the other hand, when the concentration of the reducing agent exceeds 7.0 mol %, precipitation of the precursor is excessively suppressed.

In addition, in the co-precipitating of step (iii), an additive and/or alkali carbonate which may form a complex with a transition metal may be further added. The additive may be, for example, an ammonium ion source, ethylenediamine class compounds, citric acid class compounds or the like. The ammonium ion source may be, for example, aqueous ammonia, aqueous ammonium sulfate solution, aqueous ammonium nitrate solution or the like. The alkali carbonate may be selected from the group consisting of ammonium carbonate, sodium carbonate, potassium carbonate and lithium carbonate. In this case, as desired, two or more carbonates from the group may be selected and mixed.

Addition amounts of the additive and alkali carbonate may be properly determined considering the amount of the transition metal-containing salt, pH and the like.

The present invention also provides a lithium composite transition metal oxide prepared using the transition metal precursor. In particular, a lithium composite transition metal oxide as a cathode active material for lithium secondary batteries may be prepared by mixing the transition metal precursor with the lithium precursor and reacting the resulting mixture through sintering under an oxidizing atmosphere.

The lithium precursor, which is not specifically limited, may be, for example, lithium hydroxide, lithium carbonate, lithium oxide or the like. The lithium precursor is preferably lithium carbonate ($Li_2CO_3$) and/or lithium hydroxide (LiOH).

In one specific embodiment, the lithium composite transition metal oxide may be represented by Formula 2 below.

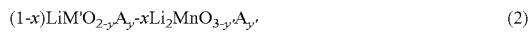
$$(1-x)LiM'O_{2-y}A_{y}-xLi_2MnO_{3-y'}A_{y'} \quad (2)$$

wherein M' is $Mn_aM_b$;

M is at least one selected form the group consisting of Ni, Ti, Co, Al, Cu, Fe, Mg, B, Cr, Zr, Zn and Period II transition metals; more specifically, M is Ni and Co, A is at least one selected form the group consisting of anions of $PO_4$, $BO_3$, $CO_3$, F and $NO_3$; and $0<x<1$; $0<y\leq0.02$; $0<y'\leq0.02$; $0.5\leq a\leq1.0$; $0\leq b\leq0.5$; and $a+b=1$.

In the lithium composite transition metal oxide, anion sites of which are substituted, ionic conductivity is improved by anions and structural change due to gas occurring at a battery activation step is reduced.

In one specific embodiment, the lithium composite transition metal oxide represented by Formula 2 may be a solid solution and composite form. In this case, as desired, the lithium composite transition metal oxide may be a mixture of the solid solution and composite form.

Inventors of the present application confirmed that the lithium composite transition metal oxide may be effectively synthesized using the transition metal precursor according to the present invention and, when the transition metal precursor was used as a cathode active material in a lithium secondary battery, the lithium secondary battery was stable under high voltage, and exhibited superior initial discharge capacity and efficiency, and improved output characteristics and lifespan characteristics.

The lithium composite transition metal oxide may be preferably used as an electrode active material for lithium secondary batteries. The lithium composite transition metal oxide may be separately used or may be used by mixing with other publicly known electrode active materials for lithium secondary batteries.

Reaction conditions of the transition metal precursor and the lithium-containing material to prepare the lithium composite transition metal oxide are publicly known in the art. Therefore, detailed descriptions of the reaction conditions will be omitted in the specification.

The present invention also provides a cathode including the lithium composite transition metal oxide as a cathode active material and a lithium secondary battery including the same.

For example, the cathode is prepared by drying after coating a mixture of the cathode active material according to the present invention, a conductive material and a binder on a cathode current collector. In this case, as desired, the mixture may further include a filler.

The cathode current collector is generally fabricated to a thickness of 3 to 500 µm. The cathode current collector is not particularly limited so long as it does not cause chemical changes in the fabricated lithium secondary battery and has high conductivity. For example, the cathode current collector may be made of stainless steel, aluminum, nickel, titanium, sintered carbon, aluminum or stainless steel surface-treated with carbon, nickel, titanium, or silver, or the like. The cathode current collector may have fine irregularities at a surface thereof to increase adhesion between the cathode active material and the cathode current collector. In addition, the cathode current collector may be used in any of various forms including films, sheets, foils, nets, porous structures, foams, and non-woven fabrics.

The conductive material is typically added in an amount of 1 to 20 wt % based on the total weight of the mixture including the cathode active material. There is no particular limit as to the conductive material, so long as it does not cause chemical changes in the fabricated battery and has conductivity. Examples of conductive materials include graphite such as natural or artificial graphite; carbon black such as carbon black, acetylene black, Ketjen black, channel black, furnace black, lamp black, and thermal black; conductive fibers such as carbon fibers and metallic fibers; metallic powders such as carbon fluoride powder, aluminum powder, and nickel powder; conductive whiskers such as zinc oxide whiskers and potassium titanate whiskers; conductive metal oxides such as titanium oxide; and polyphenylene derivatives.

The binder is a component assisting in binding between an active material and the conductive material and in binding of the active material to a current collector. The binder is typically added in an amount of 1 to 20 wt % based on the total weight of the mixture including the cathode active material. Examples of the binder include, but are not limited to, polyvinylidene fluoride, polyvinyl alcohols, carboxymethylcellulose (CMC), starch, hydroxypropylcellulose, regenerated cellulose, polyvinyl pyrrolidone, tetrafluoroethylene, polyethylene, polypropylene, ethylene-propylene-diene terpolymer (EPDM), sulfonated EPDM, styrene butadiene rubber, fluorine rubber, and various copolymers.

The filler is optionally used as a component to inhibit cathode expansion. The filler is not particularly limited so long as it is a fibrous material that does not cause chemical changes in the fabricated battery. Examples of the filler include olefin-based polymers such as polyethylene and polypropylene; and fibrous materials such as glass fiber and carbon fiber.

Generally, the lithium secondary battery includes the cathode, an anode, a separator and a lithium salt-containing non-aqueous electrolyte. The other components of the lithium secondary battery according to the present invention will be described below.

The anode may be prepared by coating and drying an anode material on an anode current collector. As desired, the anode material may further include the above-described components.

Examples of the anode active material include carbon such as hard carbon and graphite-based carbon; metal composite oxides such as $Li_xFe_2O_3$ where $0 \leq x \leq 1$, $Li_xWO_2$ where $0 \leq x \leq 1$, $Sn_xMe_{1-x}Me'_yO_z$ where Me: Mn, Fe, Pb, or Ge; Me': Al, B, P, Si, Group I, II and III elements, or halogens; $0 < x \leq 1$; $1 \leq y \leq 3$; and $1 \leq z \leq 8$; lithium metals; lithium alloys; silicon-based alloys; tin-based alloys; metal oxides such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, and $Bi_2O_5$; conductive polymers such as polyacetylene; and Li—Co—Ni-based materials.

The anode current collector is typically fabricated to a thickness of 3 to 500 pm. The anode current collector is not particularly limited so long as it does not cause chemical changes in the fabricated battery and has conductivity. For example, the anode current collector may be made of copper, stainless steel, aluminum, nickel, titanium, sintered carbon, copper or stainless steel surface-treated with carbon, nickel, titanium, or silver, and aluminum-cadmium alloys. Similar to the cathode current collector, the anode current collector may also have fine irregularities at a surface thereof to enhance adhesion between the anode current collector and the anode active material and may be used in various forms including films, sheets, foils, nets, porous structures, foams, and non-woven fabrics.

The separator is disposed between the cathode and the anode and, as the separator, a thin insulating film with high ion permeability and high mechanical strength is used. The separator generally has a pore diameter of 0.01 to 10 µm and a thickness of 5 to 300 µm. As the separator, for example, sheets or non-woven fabrics, made of an olefin-based polymer such as polypropylene; or glass fibers or polyethylene, which have chemical resistance and hydrophobicity, are used. When a solid electrolyte such as a polymer or the like is used as an electrolyte, the solid electrolyte may also serve as a separator.

The lithium salt-containing non-aqueous electrolyte consists of a non-aqueous electrolyte and lithium. As the non-aqueous electrolyte, a non-aqueous electrolyte solution, a solid electrolyte or the like may be used.

Examples of the non-aqueous electrolyte solution include non-aprotic organic solvents such as N-methyl-2-pyrrolidinone, propylene carbonate, ethylene carbonate, butylene carbonate, dimethyl carbonate, diethyl carbonate, gamma-butyrolactone, 1,2-dimethoxy ethane, tetrahydrofuran, 2-methyl tetrahydrofuran, dimethylsulfoxide, 1,3-dioxolane, formamide, dimethylformamide, dioxolane, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate, and ethyl propionate.

Examples of the organic solid electrolyte include polyethylene derivatives, polyethylene oxide derivatives, polypropylene oxide derivatives, phosphoric acid ester polymers, polyagitation lysine, polyester sulfide, polyvinyl alcohols, polyvinylidene fluoride, and polymers containing ionic dissociation groups.

Examples of the inorganic solid electrolyte include, but are not limited to, nitrides, halides and sulfates of lithium (Li) such as $Li_3N$, LiI, $Li_5NI_2$, $Li_3N$—LiI—LiOH, $LiSiO_4$, $LiSiO_4$—LiI—LiOH, $Li_2SiS_3$, $Li_4SiO_4$, $Li_4SiO_4$—LiI—LiOH, and $Li_3PO_4$—$Li_2S$—$SiS_2$.

The lithium salt is a material that is readily soluble in the non-aqueous electrolyte and examples thereof include, but are not limited to, LiCl, LiBr, LiI, $LiClO_4$, $LiBF_4$, $LiB10Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, chloroborane lithium, lower aliphatic carboxylic acid lithium, lithium tetraphenyl borate, and imides.

In addition, in order to improve charge/discharge characteristics and flame retardancy, for example, pyridine, triethylphosphite, triethanolamine, cyclic ether, ethylenediamine, n-glyme, hexaphosphoric triamide, nitrobenzene derivatives, sulfur, quinone imine dyes, N-substituted oxazolidinone, N,N-substituted imidazolidine, ethylene glycol dialkyl ether, ammonium salts, pyrrole, 2-methoxy ethanol, aluminum trichloride or the like may be added to the non-aqueous electrolyte. If necessary, in order to impart incombustibility, the electrolyte may further include halogen-containing solvents such as carbon tetrachloride and ethylene trifluoride. Further, in order to improve high-temperature storage characteristics, the non-aqueous electrolyte may further include carbon dioxide gas.

In addition, the present invention also provides a battery module including the lithium secondary battery as a unit battery and a battery pack including the battery module.

The battery pack may be used as a power source of devices that require high-voltage stability, long cycle characteristics, high rate characteristics, and the like.

Preferable examples of the devices include, but are not limited to, electric motor-driven power tools; electric vehicles (EVs), hybrid electric vehicles (HEVs), and plug-in hybrid electric vehicles (PHEVs); electric two-wheeled vehicles such as e-bikes and e-scooters; electric golf carts; and systems for storing power.

BRIEF DESCRIPTION OF THE DRAWINGS

The above and other objects, features and other advantages of the present invention will be more clearly understood from the following detailed description taken in conjunction with the accompanying drawing, in which:

FIG. 1 is a scanning electron microscopy (SEM) image of a precursor prepared according to Example 1, which was captured using FE-SEM (model S-4800 available from Hitachi);

FIG. 2 is a scanning electron microscopy (SEM) image of a precursor prepared according to Example 2, which was captured using FE-SEM (model S-4800 available from Hitachi);

FIG. 3 is a scanning electron microscopy (SEM) image of a precursor prepared according to Comparative Example 1, which was captured using FE-SEM (model S-4800 available from Hitachi); and FIG. 4 is a scanning electron microscopy (SEM) image of a precursor prepared according to Comparative Example 2, which was captured using FE-SEM (model S-4800 available from Hitachi).

BEST MODE

Now, the present invention will be described in more detail with reference to the following examples. These examples are provided for illustration of the present invention only and should not be construed as limiting the scope and spirit of the present invention.

Example 1

After filling a 4 L wet reactor tank with 3 L of distilled water, nitrogen gas was continuously added to the tank at a rate of 2 L/min to remove dissolved oxygen. Here, the temperature of distilled water in the tank was maintained at 50° C. using a temperature maintenance device. In addition, the distilled water in the tank was stirred at 1000 to 1500 rpm using an impeller connected to a motor installed outside the tank.

Manganese sulfate, nickel sulfate, and cobalt sulfate were mixed in a molar ratio of 0.50:0.45:0.05 to prepare a 1.5 M aqueous transition metal solution. Subsequently, to substitute anion sites, 0.5 mol % of phosphate and 4.0 mol % of sucrose which provide $PO_4$ anions were mixed therewith. Separately, a 3 M aqueous sodium hydroxide solution was prepared. The aqueous transition metal solution was continuously pumped into the wet reactor tank, using a metering pump, at a rate of 0.18 L/hr. The aqueous sodium hydroxide solution was pumped in a rate-variable manner by a control unit for adjusting a pH of the distilled water in the tank such that the distilled water in the wet reactor tank was maintained at a pH of 11.5. In this regard, a 14% ammonia solution as an additive was continuously co-pumped to the reactor at a rate of 0.04 L/hr.

Flow rates of the aqueous transition metal solution, the aqueous sodium hydroxide solution and the aqueous ammonia solution were adjusted such that an average residence time of the solutions in the wet reactor tank was approximately 6 hours. After the reaction in the tank reached a steady state, a certain duration of time was given to synthesize a composite transition metal precursor with a higher density.

After reaching the steady state, the manganese-nickel composite transition metal precursor, which was prepared by 20-hour continuous reaction of transition metal ions of the aqueous transition metal solution, hydroxide ions of the sodium hydroxide and ammonia ions of the ammonia solution, was continuously obtained through an overflow pipe installed on the top side of the tank.

The resulting composite transition metal precursor was washed several times with distilled water and dried in a 120° C. constant-temperature drying oven for 24 hours to obtain a manganese-nickel composite transition metal precursor.

Example 2

A transition metal precursor was prepared in the same manner as in Example 1, except that sucrose was not mixed with the aqueous transition metal solution.

Comparative Example 1

A transition metal precursor was prepared in the same manner as in Example 1, except that phosphate was not mixed with the aqueous transition metal solution.

Comparative Example 2

A transition metal precursor was prepared in the same manner as in Example 1, except that sucrose and phosphate were not mixed with the aqueous transition metal solution.

Experimental Example 1

SEM images of the transition metal precursors prepared according to Examples 1 and 2, and Comparative Examples 1 and 2, respectively, captured using FE-SEM (model S-4800 available from Hitachi), are illustrated in FIGS. 1 to 4.

Referring to FIGS. 1 to 4, it can be confirmed that the transition metal precursor of Example 1 using 2 mol % of sucrose exhibited stronger cohesive strength of primary particles than that of the precursor of Comparative Example 1 and thus particles of the precursor of Example 1 had a more spherical shape.

Referring to FIG. 1 to FIG. 4, it was confirmed that the precursor prepared according to Example 1, which uses sucrose and anion sites of which were substituted with $PO_4$, has many pores, a wide specific surface area and a uniform diameter, when compared with the precursors prepared according to Comparative Examples 1 and 2. In addition, it was confirmed that, in the precursor prepared according to Example 1, primary particles exhibited improved cohesive force and thereby particle crystallizability and particle spheroidization degree were improved. Furthermore, it was confirmed that, although sucrose was not used, the precursor prepared according to Example 2, anion sites of which were substituted with $PO_4$, exhibited improved particle crystallizability and particle spheroidization degree, when compared with the precursors prepared according to Comparative Examples 1 and 2.

Experimental Example 2

The tap densities of the precursors prepared according to Examples 1 and 2, and Comparative Examples 1 and 2, respectively, were measured and summarized in Table 1 below.

TABLE 1

| | Tap density (g/cc) |
|---|---|
| Example 1 | 1.54 |
| Example 2 | 0.95 |
| Comparative Example 1 | 0.55 |
| Comparative Example 2 | 0.80 |

As shown in Table 1, it can be confirmed that the precursors prepared according to Examples 1 and 2, anion sites of which were substituted, exhibit improved tap densities, when compared with the precursors prepared according to Comparative Examples 1 and 2, anion sites of which were not substituted. Such a result is caused by easy precipitation of the transition metal hydroxide due to anion sites substituted with $PO_4$ and thereby improved crystallizability and cohesive force of the primary particles.

Examples 3 and 4, and Comparative Examples 3 and 4

Manufacture of Coin Cell

Each of the manganese-nickel-cobalt composite transition metal precursors prepared according to Examples 1 and 2, and Comparative Examples 1 and 2 was mixed with $Li_2CO_3$ in accordance with the molar ratio of each composition and then sintered at 900 to 950.° C. for 5 to 10 hours by heating at a heating rate of 3 to 5.° C./min to prepare a cathode active material powder.

The prepared cathode active material powder, Denka as a conductive material, and KF1100 as a binder were mixed in a weight ratio of 95:2.5:2.5 to prepare a slurry. The slurry was uniformly coated on Al foil having a thickness of 20 μm. The coated Al foil was dried at 130.° C., thereby completing fabrication of a cathode for a lithium secondary battery.

The fabricated cathode for a lithium secondary battery, lithium metal foil as a counter electrode (i.e., an anode), a polyethylene membrane as a separator (Celgard, thickness: 20 μm), and a liquid electrolyte containing 1 M $LiPF_6$ dissolved in a mixed solvent of ethylene carbonate, dimethylene carbonate, and diethyl carbonate in a volume ratio of 1:2:1 were used to manufacture a 2016 coin cell.

Experimental Example 3

Initial Charge and Discharge Characteristics

Electrical characteristics of the cathode active material of each of coin cells manufactured according to Examples 3 and 4, and Comparative Examples 3 and 4 were evaluated at 3.0 to 4.4 V using an electrochemical analyzer (Toscat 3100U available from Toyo Systems).

To evaluate performance of each coin cell, charge and discharge capacity of each coin cell was measured at a current of 1 C and at a voltage range of 3.0 to 4.4 V. Results of discharge capacities and charge and discharge efficiencies of the coin cells are summarized in Table 2 below.

TABLE 2

| Samples | Initial charge capacity (mAh/g) | Initial discharge capacity (mAh/g) | Initial charge and discharge efficiency (%) |
| --- | --- | --- | --- |
| Example 3 | 185 | 172 | 93 |
| Example 4 | 183 | 169 | 92 |
| Comparative Example 3 | 169 | 153 | 90 |
| Comparative Example 3 | 180 | 162 | 90 |

As shown in Table 2, it can be confirmed that the precursors prepared according to Examples 1 and 2, anion sites of which were substituted, have superior initial charge and discharge capacity and efficiency, when compared with the precursors prepared according to Comparative Examples 1 and 2, anion sites of which were not substituted.

Experimental Example 4

Lifespan Characteristics

Each of coin cells manufactured according to Examples 3 and 4, and Comparative Examples 3 and 4 was charged and discharged thirty times at a current of 0.5 C to evaluate lifespan characteristics. Results are summarized in Table 3 below.

TABLE 3

| | Lifespan characteristics $30^{th}/1^{st}$ discharge capacity (%) |
| --- | --- |
| Example 3 | 97.0 |
| Example 4 | 92.0 |
| Comparative Example 3 | 92.2 |
| Comparative Example 4 | 96.0 |

As shown in Table 3, it can be confirmed that the precursor prepared according to Example 1, which uses sucrose and anion sites of which were substituted with $PO_4$, exhibits lifespan characteristics of 97%, which is the highest value.

Experimental Example 5

Output Characteristics

To evaluate output characteristics, each of coin cells manufactured according to Examples 3 and 4, and Comparative Examples 3 and 4 was charged and discharged at a current of 0.5 C and then discharged at a current of 1.0 C and 2.0 C. Results are summarized in Table 4 below.

TABLE 4

| | 0.1 C discharge capacity (mAh/g) | 2 C discharge capacity (mAh/g) | Output characteristics 0.1 C/2.0 C (%) |
| --- | --- | --- | --- |
| Example 3 | 172 | 146 | 85 |
| Example 4 | 172 | 136 | 79 |
| Comparative Example 3 | 155 | 121 | 78 |
| Comparative Example 3 | 166 | 112 | 67 |

As shown in Table 4, it can be confirmed that the precursors prepared according to Examples 1 and 2, anion sites of which were substituted, exhibit improved output characteristics when compared with the precursors prepared according to Comparative Examples 1 and 2, anion sites of which were not substituted.

Those skilled in the art will appreciate that various modifications, additions and substitutions are possible, without departing from the scope and spirit of the invention as disclosed in the accompanying claims.

INDUSTRIAL APPLICABILITY

As described above, a transition metal precursor for preparing a lithium composite transition metal oxide according to the present invention is prepared in a state including a reducing agent to prevent oxidation of Mn and, as such, a precursor having a larger specific surface area and a uniform diameter may be synthesized. At the same time, by substituting anion sites, precipitation suppression due to addition of a reducing agent may be solved and, as such, the crystallizability, spheroidization degree and tap density of the precursor may be improved.

In addition, when a lithium composite transition metal oxide prepared using the precursor is used as a cathode active material, an electrode process becomes easy and a secondary battery based on the lithium composite transition metal oxide may exhibit excellent initial discharge capacity and efficiency, and improved output characteristics and lifespan characteristics.

The invention claimed is:

1. A transition metal precursor having a composition represented by Formula 1 below, wherein the transition metal precursor includes a sugar-based material that exists in inner pores of the transition metal precursor:

$Mn_aM_b(OH_{1-x})_{2-y}A_y$     (1)

wherein M is Ni and Co;

A is at least one selected from the group consisting of anions of $PO_4$, $BO_3$, $CO_3$, F and $NO_3$;

$0.5 \leq a \leq 1.0$;

$0 \leq b \leq 0.5$;

$a+b=1$;

$0<x<1.0$; and $0<y \leq 0.02$.

2. The transition metal precursor according to claim 1, wherein x is 0.2 or more and less than 0.5.

3. The transition metal precursor according to claim 1, wherein Mn has a oxidation number of +2 to +3.5.

4. The transition metal precursor according to claim 1, the sugar-based material is at least one selected from the group consisting of fructose, sucrose, glucose, lactose, maltose, starch, and dextrin.

5. The transition metal precursor according to claim 1, wherein the transition metal precursor is prepared in an aqueous transition metal solution, mixed with an alkaline material, a transition metal-containing salt having a first anion, a second anion selected from the group consisting of $PO_4$, $BO_3$, $CO_3$, F and $NO_3$, and a reducing agent,
wherein the reducing agent is the sugar-based material; and
wherein the transition metal-containing salt consists of a transition metal cation and the first anion.

6. The transition metal precursor according to claim 5, wherein an amount of the reducing agent is 0.1 to 30 mol % based on a molar amount of the aqueous transition metal solution.

7. The transition metal precursor according to claim 5, wherein an amount of the reducing agent is 1.0 to 10 mol % based on a molar amount of a transition metal of the aqueous transition metal solution.

8. The transition metal precursor according to claim 5, wherein the reducing agent has a concentration of 2.0 to 7.0 mol %.

9. The transition metal precursor according to claim 5, wherein the transition metal-containing salt is at least one selected from the group consisting of sulfates, nitrates and carbonates.

10. The transition metal precursor according to claim 5, wherein the alkaline material is at least one selected from the group consisting of sodium hydroxide, potassium hydroxide and lithium hydroxide.

11. A lithium composite transition metal oxide prepared using the transition metal precursor according to claim 1.

12. The lithium composite transition metal oxide according to claim 11, wherein the lithium composite transition metal oxide is represented by Formula 2 below:

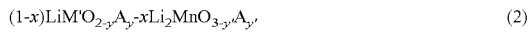

(2)

wherein M' is $Mn_aM_b$;
M is Ni and Co;
A is at least one selected from the group consisting of anions of $PO_4$, $BO_3$, $CO_3$, F and $NO_3$;
$0<x<1$;
$0<y\leq0.02$;
$0<y'\leq0.02$;
$0.5\leq a\leq1.0$;
$0\leq b\leq0.5$; and
$a+b=1$.

13. The lithium composite transition metal oxide according to claim 12, wherein the lithium composite transition metal oxide is a solid solution type or composite type.

14. A cathode comprising the lithium composite transition metal oxide according to claim 13 as a cathode active material.

15. A lithium secondary battery comprising the cathode according to claim 14.

16. A battery module comprising the lithium secondary battery according to claim 15 as a unit battery.

17. A battery pack comprising the battery module according to claim 16.

18. A device comprising the battery pack according to claim 17.

19. The device according to claim 18, wherein the device is an electric vehicle, a hybrid electric vehicle, a plug-in hybrid electric vehicle, or a system for storing power.

* * * * *